United States Patent Office 3,833,563
Patented Sept. 3, 1974

3,833,563
NOVEL PREGNANOIC ACID DERIVATIVES
Henry Laurent, Rudolf Wiechert, Klaus Prezewowsky, Helmut Hofmeister, Erich Gerhards, Klaus Mengel, and Karl Heinz Kolb, Berlin, Germany, assignors to Schering Aktiengesellschaft, Berlin and Bergkamen, Germany
No Drawing. Continuation-in-part of application Ser. No. 284,710, Aug. 30, 1972. This application Oct. 3, 1972, Ser. No. 294,527
Claims priority, application Germany, Oct. 4, 1971, P 21 50 270.5; Feb. 22, 1972, P 22 09 298.4, P22 09 312.5
Int. Cl. C07c 173/00
U.S. Cl. 260—239.55 D
73 Claims

ABSTRACT OF THE DISCLOSURE

Pregnanoic acid derivatives of the formula

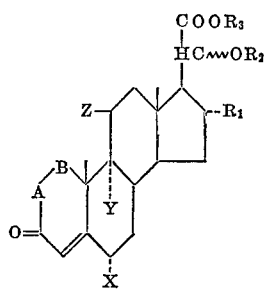

wherein the group $OR_2$ is in the $\alpha_F$- or $\beta_F$-position; X is hydrogen, halogen or methyl; Y is hydrogen or halogen; Z is hydroxy or halogen having an atomic weight no greater than Y; $R_1$ is hydrogen or methyl; $R_2$ is hydrogen or acyl and $R_3$ is hydrogen, alkali metal or saturated or unsaturated unsubstituted or substituted hydrocarbon of 1–18 carbon atoms, or collectively $R_2$ and $R_3$ are dialkylmethylene or cycloalkylidene; and at least one of X, Y and $R_1$ are other than hydrogen; and —A—B— is —$CH_2$—$CH_2$—, —CH=CH— or —CCl=CH;

possess pronounced topical anti-inflammatory activity as well as being intermediates for the production of the corresponding 20-keto steroids.

BACKGROUND OF THE INVENTION

This invention relates to novel pregnanoic acid derivatives.

One of us, with others, has published the isolation of 6α-fluoro-11β-01-3,20-dioxo-16α-methyl-pregna-1,4-dien-21-acid (Compound I) as a water-soluble metabolite of fluocortolone in humans. E. Gerhards et al., *Acta Endrocrinologica*, 68 (1971) 98–126. The preparation of the ethyl ester thereof for characterization purposes was also reported in that publication.

We have found that 21-oxy compounds useful for the production of these and structurally related compounds claimed in the copending application of Laurent et al., SN 284,710, filed August 30, 1972, of which this application is a continuation-in-part, possess valuable pharmacological activity.

SUMMARY OF THE INVENTION

In one aspect, this invention relates to novel compounds of the general Formula I

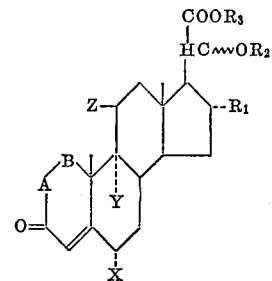

wherein the group —$OR_2$ is in the $\alpha_F$- or $\beta_F$-position; X is hydrogen, halogen or methyl; Y is hydrogen or halogen; Z is hydroxy or halogen having an atomic weight no greater than Y; $R_1$ is hydrogen or methyl; $R_2$ is hydrogen or acyl as defined hereinafter and $R_3$ is hydrogen, an alkali-metal, or a saturated hydrocarbon of 1–18 carbon atoms which is unsubstituted or substituted, or a corresponding unsaturated hydrocarbon, or collectively $R_2$ and $R_3$ are dialkylmethylene or cycloalkylidene, at least one of $R_1$, $R_2$ and $R_3$ is other than a hydrogen atom; and —A—B— is —$CH_2$—$CH_2$—, —CH=CH—, —CCl=CH—.

In another aspect, this invention relates to pharmaceutical compositions, especially pharmaceutical compositions adapted for topical application, comprising one or more of the novel compounds of this invention.

In a further aspect, this invention relates to novel processes for the production of these compounds.

In a method of use aspect, this invention relates to the treatment topically of inflammatory conditions.

DETAILED DISCUSSION

Of the compounds of Formula I, preferred sub-classes are those wherein:
Ia. $R_3$ is alkyl of 1–12 carbon atoms, preferably 1–8 carbon atoms;
Ib. X and/or Z are chloro or fluoro, preferably fluoro, especially those of Ia;
Ic. Y is hydrogen, especially those of Ia and Ib;
Id. Z is hydroxy, especially those of Ia, Ib and Ic;
Ie. —A—B— is —CH=CH—, especially those of Ia, Ib, Ic and Id;
If. $R_1$ is methyl, especially those of Ia, Ib, Ic, Id and Ie;
Ig. $R_3$ is sodium or potassium when $R_3$ is alkali-metal, or alkyl of 1–4 carbon atoms when $R_3$ is alkyl; and
Ih. Y and Z are both chloro or Y is fluoro and Z is hydroxy.

Because activity resides in the pregnanoic acid steroidal structure, esters of the free 20-hydroxy group also possess the utility of the free alcohol.

Suitable 20-ester groups are those wherein $R_2$ is the radical of physiologically acceptable acids. Examples of such acids are organic carboxylic acids of up to 15 carbon atoms, preferably 1 to 12, more preferably 1 to 8 carbon atoms. Although esters of alkanoic acids are preferred, also suitable are esters of cycloaliphatic, carbocyclic aryl, aralkyl, alkaryl and heterocyclic carbocyclic acids. Examples of such acids are formic acid, acetic acid, propionic acid, butyric acid, valeric acid, caproic acid, enanthic acid, undecylic acid, trimethylacetic acid, diethylacetic acid, tert.-butylacetic acid, phenylacetic acid, cyclopentylpropionic acid, oleic acid, lactic acid, mono-, di-, and trichloroacetic acid, aminoacetic acid, diethylamino-, piperidino-, and morpholinoacetic acid, succinic acid, adipic acid, benzoic acid and nicotinic acid.

Especally preferred $R_2$ acyl groups are alkanoyl of 1–8 carbon atoms and benzoyl. However, $R_2$ can be the acyl radical of an acid which is unsaturated, branched, polybasic or substituted in the usual manner, e.g., by hydroxy, oxo or amino groups, or by halogen atoms.

Because activity resides in the pregnanoic acid steroidal structure, 21-carboxylic acid esters also posses the utility of the free 21-carboxylic acid and its salts. Thus, —COOR$_3$ can also represent an ester group.

For example, R$_3$ can be any hydrocarbon group of 1–18, preferably 1–12, carbon atoms. The hydrocarbon group can be, e.g., alkyl or cycloalkyl, preferably monocyclic, or carbocyclic aryl, aralkyl or alkaryl.

Examples of alkyl R$_3$ groups are alkyl of 1–12, preferably 1–8, more preferably 1–4 carbon atoms, e.g., methyl, ethyl, propyl, isopropyl, n-butyl and tert.-butyl. Examples of cycloalkyl R$_3$ groups are those containing 3–12, preferably 5 or 6 ring carbon atoms, e.g., cyclopropyl, cyclopentyl, cyclohexyl, cycloheptyl and 1,4-methyleno-cyclohexyl and p-dicyclohexyl. Examples of carbocyclic aryl R$_3$ groups are mono and dicyclic carbocyclic of up to 12 carbon atoms, e.g., phenyl, α-naphthyl and β-naphthyl and p-diphenyl. Examples of carbocyclic alkaryl R$_3$ groups are tolyl, xylyl, ethylphenyl and sym-diethylphenyl. Examples of carbocyclic aralkyl R$_3$ groups are benzyl, phenethyl, α-phenpropyl and diphenylmethyl.

Equivalents of the alkyl, cycloalkyl, carbocyclic aryl, aralkyl and alkaryl hydrocarbon are unsaturated alkyl and cycloalkyl. Examples of unsaturated aliphatic are vinyl, allyl, propenyl, propynyl, butenyl and butynyl. Examples of unsaturated cycloalkyl are cyclopentenyl and cyclopentadienyl.

Additional equivalents of hydrocarbon as defined above are hydrocarbon groups, preferably alkyl or phenyl, bearing 1, 2, 3 or more simple substituents, preferably one, since such substitutents preferably one, since such substituents ordinarily do not affect the overall activity of the parent pregnanoic acid. Examples of such simple substitutents are hydroxy, halo, e.g., Cl or F, NO$_2$, sulfato and alkali-metal salts thereof, amido, lower-alkoxy, i.e., containing 1–4 carbon atoms, e.g., methoxy, ethoxy, propoxy, butoxy and tert.-butoxy group; carboxy, the alkali-metal, e.g., sodium and potassium salts thereof and lower-alkyl esters thereof, e.g., carbomethoxy. carboethoxy; amino groups and the pharmaceutically acceptable acid addition salts thereof, e.g., primary amino, mono- and di-lower-alkylamino, e.g., methylamino, dimethylamino, ethylamino, diethylamino, methyl, ethylamino, propylamino, butylamino and the pharmaceutically acceptable acid addition salts thereof. The acid addition salts are preferably those of the strong mineral acids, e.g., hydrochlorides, hydrobromides, sulfates and phosphates. and the polybasic or hydroxy acids, e.g., oxalates, maleates, citrates and tartrates and any other pharmaceutically acceptable acid.

Examples of preferred R$_3$ groups are methyl, carboxymethyl, ethyl, 2-hydroxyethyl, 2-methoxyethyl, 2-aminoethyl, 2-dimethylaminoethyl, 2-carboxyethyl, propyl, allyl, cyclopropyl, isopropyl, 3-hydroxypropyl, propynyl, 3-aminopropyl, butyl, sec.-butyl, tert.-butyl. 2-butyl, pentyl, isopentyl, tert.-pentyl, 2-methylbutyl, cyclopentyl, hexyl, cyclohexyl, cyclohex-2-enyl, cyclopentylmethyl, heptyl, benzyl, 2-phenylethyl, octyl, bornyl, isobornyl, menthyl, nonyl, decyl, 3-phenylpropyl, 3-phenylprop-2-enyl, dodecyl, tetradecyl, hexadecyl and octadecyl.

When R$_2$ and R$_3$ collectively are dialkylmethylene, the alkyl groups thereof are of 1–4 carbon atoms, i.e., the dialkylmethylene group contains up to 9 carbon atoms. Examples are 2,2-propylidene, 2.2-butylidene, 2,2-pentylidene, 3,3-pentylidene and 2,2-hexylidene. When R$_2$ and R$_3$ are cycloalkylidene, the cycloalkylidene is of 5 to 7 ring carbon atoms and contains up to a total of carbon atoms, preferably cyclopentylidene or cyclohexylidene.

In addition to the 16α-methyl compounds of the examples hereinafter, examples of 16 unsubstituted compounds of this invention are methyl ester of 6α-fluoro-11β,20α$_F$-dihydroxy-3-oxo - 1,4-pregnadiene-21-oic acid; methyl ester of 6αfluoro-11β,20β$_F$-dihydroxy-3-oxo-1,4-pregnadiene-21-oic acid; methyl ester of 9α-fluoro-11β,20α$_F$-dihydroxy-3-oxo-1,4-pregnadiene-21-oic acid; methyl ester of 6α,9α-difluoro-11β,20β$_F$ - dihydroxy-3-oxo-1,4-pregnadiene-oic acid; methyl ester of 9α.11β-dichloro-20α$_F$-dihydroxy-3-oxo-1,4-pregnadiene-21-oic acid; methyl ester of 2,6α-difluoro-11β,20β$_F$-dihydroxy - 3-oxo-1,4-pregnadiene-21-oic acid; methyl ester of 6α-fluoro-11β,20α$_F$-dihydroxy-3-oxo-4-pregnene-21-oic acid; 6α-fluoro - 11β-hydroxy-20β$_F$,21-isopropylidenedioxy-1,4 - pregnadiene-3,21-dione; 6β-fluoro-11β-hydroxy-20α$_F$,21 - cyclopentylidenedioxy-1,4-pregnadiene-3,21-dione; and methyl ester of 6α-fluoro-11β-hydroxy-20β$_F$-acetoxy - 1,4-pregnadiene-21-oic acid.

According to the process of this invention, pregnanoic acids of general Formula I, are produced by:

(a) reacting a 21-hydroxy steroid of the general Formula II

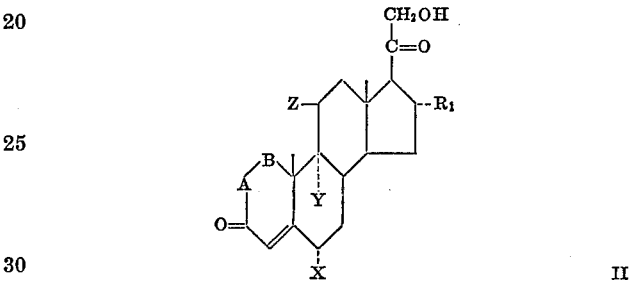

wherein —A—B—, X, Y, Z and R$_1$ have the values given above, with an alcohol in the presence of a copper (II) salt; or (b) rearranging a compound of the general Formula III

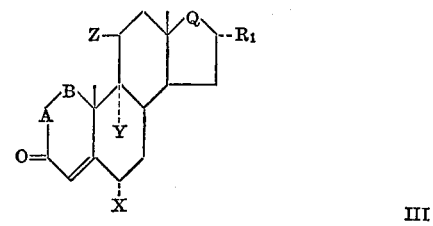

wherein —A—B—. X, Y, Z and R$_1$ have the values given above, and Q is one of the groupings:

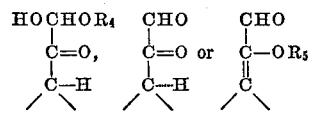

wherein R$_4$ is an alkyl group and R$_5$ is an acyl group, by treatment with strong bases; and optionally thereafter, saponifying any ester groups of the thus-produced product, and/or esterifying a free 20-hydroxy group and/or condensing a 21-oic acid with a ketone.

In the process of this invention according to method (a), preferred copper (II) salts are salts of lower carboxylic acids, e.g., copper (II) formate, copper (II) acetate, copper (II) propionate, or copper (II) isobutyrate. Copper (II) salts of inorganic acids can also be utilized.

In the process of method (a), the alcohols which are employed as the reactants can also be used simultaneously as the reaction solvent. It is, of course, also possible to employ other solvents which solvents are inert to the respective reaction conditions in addition to the alcohols. Examples of such solvents are hydrocarbons, e.g., benzene and toluene, and ethers, e.g., diethyl ether. di-isopropyl ether, tetrahydrofuran and dioxane.

The reaction is preferably conducted at a reaction temperature of from 0° C. to 150° C. By conducting the process of this invention for at least two days at room temperature, or at least two hours at the boiling temperature of the solvent or solvent mixture employed, the compounds of general Formula I are obtained directly from the compounds of general Formula II.

In this preferred embodiment of the process of this invention, a rather complex succession of reactions takes place from the viewpoint of reaction mechanisms. In spite of the complex course of the reaction, surprisingly, it is generally usable for the synthesis of esters of general Formula I wherein $R_3$ is a primary, secondary, or tertiary ester group.

By conducting the process of method (a) for 15–120 minutes at room temperature, one obtains, in addition to the compounds of general Formula I, intermediates thereto of general Formula IIIa

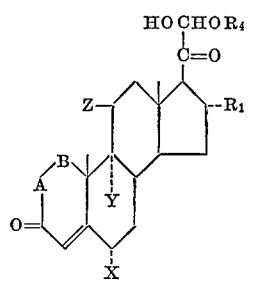

IIIa wherein —A—B—, X, Y, Z, $R_1$ and $R_4$ have the values given above.

The compounds of general Formula IIIa can be converted to the compounds of general Formula I not only according to method (a), but also according to method (b).

According to method (b), compounds of general Formula III are rearranged into the carboxylic acids of general Formula I by treatment with a strong base in an aqueous-alcoholic solution. Suitable strong bases are alkali hydroxides, such as, for example, sodium hydroxide, and potassium hydroxide, alkaline earth hydroxides, e.g., calcium hydroxide and barium hydroxide, quaternary ammonium bases, e.g., tetramethylammonium hydroxide. This reaction can be conducted, for example, at room temperature or at an elevated temperature.

In the process of the invention, mixtures of the $20\alpha_F$- and $20\beta_F$-hydroxy compounds of general Formula I are produced. The respective isomers can be separated from this mixture by chromatography and/or crystallization.

The saponification of the 21-esters of Formula I which optionally is conducted subsequently, can be conducted in accordance with conventional methods, e.g., by saponification of the esters in water or in aqueous alcohol, in the presence of acidic catalysts, e.g., hydrochloric acid, sulfuric acid or p-toluene-sulfonic acid, or in the presence of a basic catalyst, e.g., potassium bicarbonate, potassium carbonate, sodium hydroxide or potassium hydroxide.

The esterification of the free acids which also can optionally follow is likewise effected according to conventional reaction procedures. Thus, the free acids can be reacted, for example, with diazomethane or diazoethane, thus obtaining the corresponding methyl and ethyl esters, respectively. A generally applicable method is the reaction of the acids with the alcohols in the presence of carbonyl diimidazole, dicyclohexyl carbodimide or trifluoroacetic anhydride. It is also possible to convert the acids into the silver salts thereof followed by reaction with an alkyl halide.

Another method resides in converting free acids of Formula I into their corresponding alkyl esters by reaction with a dimethylformamide alkyl acetal. The acids can also be reacted with the alcohols or the lower-alkanecarboxylic acid esters of the alcohols in the presence of a strongly acidic catalyst, e.g., hydrogen chloride, sulfuric acid, perchloric acid, trifluoromethylsulfonic acid or p-toluenesulfonic acid. It is also possible to convert the carboxylic acids into their acid chloride or acid anhydride which is then reacted with an alcohol in the presence of a basic catalyst. The acid esters can also be transesterified in a conventional manner with an alcohol in the presence of an acidic or basic catalyst.

The optional esterification of the 20-hydroxy steroids of general Formula I is likewise conducted according to conventional methods. Thus, the 20-hydroxy steroids can be esterified, for example, with a carboxylic acid in the presence of carbonyl diimidazole, dicyclohexyl carbodiimide or trifluoroacetic anhydride, or with the corresponding acid anhydrides or acid chlorides in the presence of a basic catalyst, e.g., potassium bicarbonate, pyridine, lutidine or collidine.

The optionally condensation of the 20-hydroxy-21-oic acids of general Formula I with a ketone takes place in accordance with conventonal operating methods, e.g., by reaction with an excess of the ketone in the presence of a strongly acidic catalyst. In this reaction, the ketone reactant also can serve as the reaction solvent. Additional inert solvents, e.g., dioxane, tetrahydrofuran and glycol dimethyl ether, can also be employed.

Examples of ketones which can be used in the present process are, in particular: dialkyl ketones, e.g., acetone, methyl ethyl ketone, diethyl ketone, methyl butyl ketone, ethyl butyl ketone, dipropyl ketone and cycloalkanones, e.g., cyclopentanone or cyclohexanone.

Preferred acidic catalyst for the condensation are mineral acids and Lewis acids, e.g., hydrochloric acid, sulfuric acid, perchloric and boron trifluoride.

This condensation can be effected at room temperature or at an elevated temperature of up to about 150° C.

The compounds of general Formula I, upon local application, exhibit an anti-inflammatory effectiveness which, in many cases, is greater than the anti-inflammatory effectiveness of the corresponding 21-hydroxy steroids and 21-acyloxy steroids.

Topical anti-inflammatory effectiveness can be determined on the rat ear in accordance with the method of Tonelli, as follows:

The substance to be tested is dissolved in an irritant, consisting of 4 parts of pyridine, 1 part of distilled water, 5 parts of ether and 10 parts of a 4% ethereal croton oil solution. Felt strips attached to the insides of an object-slide pincette are saturated with this test solution and the pincette is brought into contact, under slight pressure for 15 seconds, with the right ear of male rats having a weight of 100–160 g. The left ear remains untreated and serves as control. Three hours after the application, the animals are sacrificed and discs of 9 mm. diameter are punched from their ears. The weight difference between the slice of the right ear and that of the left ear is a measure for the thus-formed edema.

The dosage of test compound is determined at which no edema formation occurs. From this dosage, the relative effectiveness of the test compound, compared to the erectiveness of 6α-fluoro-11β,21-dihydroxy-16α-methyl-1,4-pregnadiene-3,20-dione (=fluocortolone), is determined. Table I gives the results of such testing.

TABLE I.—RAT EAR TEST

| No. | Substance | Relative effectiveness as compared to fluocortolone |
|---|---|---|
| I | Methyl ester of 6α-fluoro-11β,20α.-dihydroxy-3-oxo-16α-methyl-1,4-pregnadien-21-oic acid. | 0.7 |
| II | Methyl ester of 6α-fluoro-11β,20β.-dihydroxy-3-oxo-16α-methyl-1,4-pregnadien-21-oic acid. | 0.6 |
| III | Butyl ester of 6α-fluoro-11β,20α.-dihydroxy-3-oxo-16α-methyl-1,4-pregnadien-21-oic acid. | 1.2 |
| IV | Butyl ester of 6α-fluoro-11β,20β.-dihydroxy-3-oxo-16α-methyl-1,4-pregnadien-21-oic acid. | 1.0 |

Similar results are obtained when determining the local antiphlogistic effectiveness according to the standard vaso-constriction test on humans.

In addition to anti-inflammatory activity, the compounds of general Formula I have a surprising spectrum of pharmacological properties. For example, the tested compounds were entirely inactive systemically, as evidenced by the pharmacological investigations:

SPF rats (130-150 g.) are injected, for the generation of a focus of inflammation with 0.1 ml. of a 0.5% *Mycobacterium butyricum* suspension (obtainable from the U.S. firm Difco) into the right hind paw. Prior to the injection, the paw volume of the rats is measured. The paw volume is once again measured 24 hours after injection to determine the extent of the edema. Thereafter, the rats receive subcutaneous injections of varying amounts of test substance dissolved in a mixture of 29% benzyl benzoate and 71% castor oil. After another 24 hours, paw volume is once more determined. The control animals are treated in the same manner, except that they are injected with a benzyl benzoate castor oil vehicle only. From the thus-obtained paw volumes, the edema-inhibitory effect is calculated in percent in the usual manner.

In these experiments, the comparison compound employed is the conventional 6α-fluoro-11β,21-dihydroxy-16α-methyl-1,4-pregnadiene-3,20-dione. This compound causes, at a dosage of 1.0 mg./kg. of body weight, an edema-inhibitory effect of about 40%. An edema-inhibitory effect of 0% is always obtained when conducting these experiments, for example, with 0.3 mg.; 1.0 mg.; 3.0 mg.; or 10 mg. per kg. of body weight of the methyl ester of 6α-fluoro-11β,20α$_F$-dihydroxy-3-oxo-16α-methyl-1,4-pregnadien-21-oic acid, the methyl ester of 6α-fluoro-11β,20β$_F$-dihydroxy-3-oxo 16α-methyl-1,4-pregnadien-21-oic acid, the butyl ester of 6α-fluoro-11β,20α$_F$-dihydroxy-3-oxo-16α-methyl-1,4-pregnadien-21-oic acid, or the butyl ester of 6α-fluoro-11β,20β$_F$-dihydroxy-3-oxo-16α-methyl-1,4-pregnadien-21-oic acid. Thus, these compounds exhibit no measurable systemic anti-inflammatory effect.

For the determination of the thymolytic effect, SPF rats weighing 70-110 g. are adrenalectomized under ether narcosis. Six animals form each test group, each receiving subcutaneous injections, over a period of 3 days, of the selected amount of the test compound dissolved in a mixture of 29% benzyl benzoate and 71% castor oil. On the fourth day, the animals are sacrificed and the weight of their thymus is determined. The control animals are treated in the same way, but receive only the benzyl benzoate-castor oil vehicle. From the thus-obtained thymus weights, the thymolytic effect is calculated in percent in the usual manner.

The standard compound again is 6α-fluoro-11β,21-dihydroxy-16α-methyl-1,4-pregnadiene-3,20-dione, effecting, at a dosage of 1.0 mg/kg. of body weight, an approximately 35% thymolysis. 0% thymolytic effect is obtained when conducting these same experiment with 0.3 mg.; 1.0 mg.; 3.0 mg.; and 10 mg., per kg. of body weight of the methyl ester of 6α-fluoro-11β,20α$_F$-dihydroxy-3-oxo-16α-methyl-1,4-pregnadien-21-oic acid, the methyl ester of 6α-fluoro-11β,20β$_F$-dihydroxy-3-oxo-16α-methyl-1,4-pregnadien-21-oic acid, the butyl ester of 6α-fluoro-11β,20α$_F$-dihydroxy-3-oxo-16α-methyl-1,4-pregnadien-21-oic acid and the butyl ester of 6α-fluoro-11β,20β$_F$-dihydroxy-3-oxo-16α-methyl-1,4-pregnadien-21-oic acid.

The fact that the compounds of general Formula I do not possess systemic side effects can likewise be demonstrated with the aid of the eosinophile test, the glycogen test or the sodium-potassium retention test.

Thus, compounds of this invention which have been tested exhibit excellent topical anti-inflammatory activity but not systemic activity. Therefore, these compounds are suitable for the treatment of skin inflammations and surprisingly are entirely inactive systemically.

The corticoids hitherto employed for the treatment of skin inflammations possess, in addition to the topical activity, systemic effects. These corticoids can enter the bloodstream even upon topical application, due to resorption through the inflamed skin or due to skin injuries, where they undesirably affect, as hormone-active substances, the body functions in a great variety of ways.

This disadvantage does not exist with the compounds of the present invention, which are topically active but systemically ineffective. Therefore, they have advantages for the local treatment of inflammations over conventional corticoids. Consequently, these substances can be applied topically without danger of side-effects to infants, pregnant females and diabetics, wherein the topical treatment with conventional corticoids generally is avoided in view of the danger of systemic side-effects.

The novel compounds are suitable, in combination with the excipients customary in galenic pharmacy, for the local treatment of contact dermatitis, eczemas of a wide variety of types, neurodermatitis, erthrodermia, burns, pruritus vulvae et ani, rosacea, erythematodes, cutaneus, psoriasis, lichen ruber planus et verrucosus, and similar skin diseases.

The drug specialties are produced in the usual manner, by converting the effective agents together with suitable additives into the desired form of application, such as, for example, solutions, lotions, ointments, creams, aerosols and plasters. In the thus-formulated medicines, the concentration of effective agent is dependent on the form of application. In case of lotions and ointments, an effective agent concentration of 0.001% to 1% is preferably employed.

The topically active, but systemically inactive compounds of this invention can be utilized not only as drugs but also for the manufacture of cosmetic preparations in combination with the usual vehicles and scent compounds.

The 20-hydroxy steroids of general Formula I are also valuable as intermediates, preferably for the production of compounds of general Formula IV

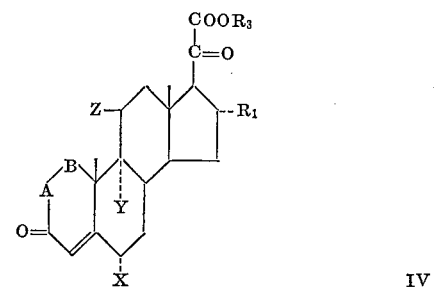

IV wherein —A—B—, X, Y, Z, $R_1$ and $R_3$ have the same meanings as indicated in Formula I, for example, by oxidizing a solution of a compound of Formula I in methylene chloride with active manganese (IV) oxide.

The compounds of general Formula IV also possess an excellent topical anti-inflammatory effectiveness and also are systemically active.

The starting compounds of Formula III, heretofore not described, for the process of method (b) can be produced, for example, as follows:

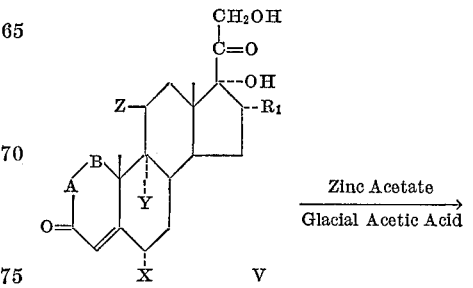

V

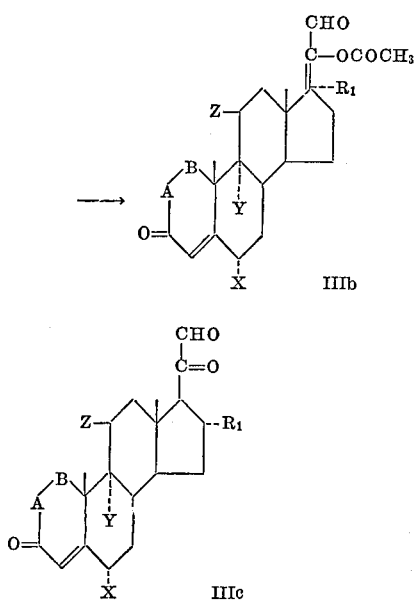

In the above formulae, —A—B—, X, Y, Z and $R_1$ have the values given in Formula I.

This reaction can be conducted, for example, by dissolving a steroid of Formula V in glacial acetic acid, mixing the solution with zinc acetate and heating under reflux. The thus-obtained mixture of compounds IIIb and IIIc can be employed, without isolating the individual compounds, directly as starting material for the process of this invention according to method (b).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

A solution of 11.3 g. of 6α-fluoro-11β,21-dihydroxy-16α-methyl-1,4-pregnadiene-3,20-dione in 500 ml. of absolute methanol is mixed with 3.0 g. of copper(II) acetate in 500 ml. of absolute methanol. The solution is stirred at room temperature for 170 hours, then filtered, and concentrated under vacuum. The residue is mixed with 10% ammonium hydroxide solution and extracted with methylene chloride. The organic phase is washed, dried over sodium sulfate, and concentrated under vacuum. The remaining product is chromatographed on 1.3 kg. of silica gel. After recrystallization from acetone-hexane, one obtains, with 6–7% acetone-methylene chloride, 1.40 g. of the methyl ester of 6α-fluoro-11β,20α$_F$-dihydroxy-3-oxo-16α - methyl-1,4-pregnadien-21-oic acid, m.p. 191–192° C. $[\alpha]_D^{25}=0°$ (chloroform). With 8–10% acetone-methylene chloride, after recrystallizing the product twice from acetone-hexane, one obtains 2.9 g. of the methyl ester of 6α-fluoro-11β,20β$_F$-dihydroxy-3-oxo-16α-methyl-1,4-pregnadien-21-oic acid, m.p. 128–130° C. $[\alpha]_D^{25}=+22°$ (chloroform).

Example 2

6.0 g. of 6α-fluoro-11β,21-dihydroxy-16α-methyl-1,4-pregnadiene-3,20-dione is allowed to stand in 180 ml. of n-butanol with 1.6 g. of copper(II) acetate for 8 days. The reaction product is worked up analogously to Example 1. The crude product is chromatographed on 350 g. of silica gel. With 9–11% acetone-methylene chloride, after recrystallization from acetone-hexane, 960 mg. of the butyl ester of 6α-fluoro-11β,20α$_F$-dihydroxy-3-oxo-16α-methyl-1,4-pregnadien-21-oic acid is obtained, m.p. 144–145° C. $[\alpha]_D^{25}=+3.4°$ (chloroform).

With 11–13% acetone-methylene chloride, 1.9 g. of a mixture of the butyl esters of 6α-fluoro-11β,20α$_F$-dihydroxy-3-oxo-16α-methyl-1,4-pregnadien-21-oic acid and of 6α - fluoro-11β,20β$_F$-dihydroxy-3-oxo-16α-methyl-1,4-pregnadien-21-oic acid is obtained by elution. With 13–15%, after recrystallization from acetone-hexane, one obtains 1.71 g. of the butyl ester of 6α-fluoro-11β,20β$_F$-dihydroxy-3-oxo-16α-methyl-1,4-pregnadien-21-oic acid, m.p. 176–177° C. $[\alpha]_D^{25}=+12°$ (chloroform).

Example 3

A mixture of 8.2 g. of 6α-fluoro-9α-chloro-11β,21-dihydroxy-16α-methyl-1,4-pregnadiene-3,20-dione, 200 ml. of isobutanol, and 4.1 g. of copper(II) acetate is heated on a steam bath for 53 hours and worked up as described in Example 1. The crude product is chromatographed on 400 g. of silica gel. With 6–7% acetone-methylene chloride, after recrystallization from acetone-hexane, one obtains 1.00 g. of the isobutyl ester of 6α-fluoro-9α-chloro-11β,20α$_F$-dihydroxy - 3 - oxo-16α-methyl-1,4-pregnadien-21-oic acid, m.p. 189° C. $[\alpha]_D^{25}=+48°$ (dioxane). After recrystallization from acetone-hexane, with 8–10% methylene chloride-acetone, 2.1 g. of the isobutyl ester of 6α-fluoro-9α-chloro-11β,20β$_F$-dihydroxy-3-oxo-16α-methyl-1,4-pregnadien-21-oic acid is obtained, m.p. 215–216° C. $[\alpha]_D^{25}=+39°$ (dioxane).

Example 4

16.0 g. of 6α,9α-difluoro-11β,21-dihydroxy-16α-methyl-1,4-pregnadiene-3,20-dione, 8 g. of copper(II) acetate, and 1000 ml. of methanol are reacted, worked up, and chromatographed as described in Example 1. After once recrystallizing from hexane-acetone, there is produced with 6–8% acetone-methylene chloride 1.1 g. of the methyl ester of 6α,9α-difluoro-11β,20α$_F$-dihydroxy-3-oxo-16α-methyl-1,4-pregnadien-21-oic acid, m.p. 174° C. $[\alpha]_D^{25}=+21°$ (dioxane). With 9–11% acetone-methylene chloride, after recrystallization from acetone-hexane, one produces 5.3 g. of the methyl ester of 6α,9α-difluoro-11β,20β$_F$-dihydroxy-3-oxo-16α-methyl - 1,3 - pregnadien - 21 - oic acid, m.p. 236° C $[\alpha]_D^{25}=+17°$ (dioxane).

Example 5

16.0 g. of 6α-fluoro-2-chloro-11β,21-dihydroxy-16α-methyl-1,4-pregnadiene-3,20-dione is heated with 8.0 g. of copper(II) acetate in 800 ml. of methanol under reflux to the boiling point for 50 hours. The reaction mixture is worked up as disclosed in Example 1. The crude product is chromatographed on 1.2 kg. of silica gel. After recrystallization from acetone-hexane, with 8–9% acetone-methylene chloride, 550 mg. of the methyl ester of 6α-fluoro - 2 - chloro-11β,20α$_F$-dihydroxy-3-oxo-16α-methyl-1,4-pregnadien-21-oic acid is produced, m.p. 230–232° C. $[\alpha]_D^{25}=-1.4°$ (dioxane). With 10–13% acetone-methylene chloride, 10.5 g. of a mixture of the methyl esters of 6α-fluoro-2-chloro-11β,20α$_F$-dihydroxy-3-oxo-16α-methyl-1,4-pregnadien-21-oic acid and of 6α-fluoro-2-chloro-11β,20β$_F$-dihydroxy - 3 - oxo-16α-methyl-1,4-pregnadien-21-oic acid is obtained in the form of a viscous, colorless oil, by elution.

After recrystallization from acetone-hexane, with 13–14% acetone-methylene chloride, one produces 1.12 g. of the methyl ester of 6α-fluoro-2-chloro-11β,20β$_F$-dihydroxy-3-oxo-16α-methyl-1,4-pregnadien-21-oic acid, m.p. 211–212° C. $[\alpha]_D^{25}=-13°$ (dioxane).

Example 6

5.0 g. of 6α-fluoro-11β,21-dihydroxy-16α-methyl-1,4-pregnadiene-3,20-dione is mixed with 250 ml. of isopropanol and 2.5 g. of copper(II) acetate. The mixture is refluxed for 6 hours and worked up as described in Example 1. The crude product is chromatographed on 250 g. of silica gel. After recrystallization from acetone-hexane, one obtains, with 7–9% acetone-methylene chloride, 309 mg. of the isopropyl ester of 6α-fluoro-11β,20α$_F$-dihydroxy-3-oxo-16α-methyl-1,4-pregnadien-21-oic acid, m.p. 183–184° C. [α]$_D^{25}$=+8.5° (chloroform). After recrystallization from hexane-acetone, with 10–12% acetone-methylene chloride, 459 mg. of the isopropyl ester of 6α-fluoro-11β,20β$_F$-dihydroxy-3-oxo-16α-methyl-1,4-pregnadien-21-oic acid is obtained, m.p. 182–183° C. [α]$_D^{25}$=+19° (chloroform).

Example 7

Under the reaction conditions set forth in Example 1, but using isoamyl alcohol as the solvent, one produces from 16.0 g. of 6α-fluoro-11β,21-dihydroxy-16α-methyl-1,4-pregnadiene-3,20-dione 3.88 g. of the isopentyl ester of 6α-fluoro-11β,20α$_F$-dihydroxy-3-oxo-16α-methyl-1,4-pregnadien-21-oic acid, m.p. 74–78° C. (from hexane-acetone), [α]$_D^{25}$=+4.4° (chloroform), as well as 1.47 g. of the isopentyl ester of 6α-fluoro-11β,20β$_F$-dihydroxy-3-oxo-16α-methyl-1,4-pregnadien-21-oic acid, m.p. 188° C. (from hexane-acetone), [α]$_D^{25}$=+12° (chloroform).

Example 8

Under the reaction conditions described in Example 1, but using tert.-butanol as the solvent, the yield, from 20.0 g. of 6α-fluoro-11β,21-dihydroxy-16α-methyl-1,4-pregnadiene-3,20-dione, is 9.8 g. of a mixture of the tert.-butyl esters of 6α-fluoro-11β,20α$_F$-dihydroxy-3-oxo-16α-methyl-1,4-pregnadien-21-oic acid and of 6α-fluoro-11β,20β$_F$-dihydroxy-3-oxo-16α-methyl-1,4-pregnadien-21-oic acid, as well as 1.08 g. of the tert.-butyl ester of 6α-fluoro-11β,20β$_F$-dihydroxy-3-oxo-16α-methyl-1,4-pregnadien-21-oic acid, m.p. 182° C. (from hexane-acetone). [α]$_D^{25}$=+16° (chloroform).

Example 9

Using the reaction conditions described in Example 1, but with ethanol being the solvent, one obtains from 8.6 g. of 6α,9α-difluoro-11β,21-dihydroxy-16α-methyl-1,4-pregnadiene-3,20-dione 6.1 g. of a mixture of the ethyl esters of 6α,9α-difluoro-11β,20α$_F$-dihydroxy-3-oxo-16α-methyl-1,4-pregnadien-21-oic acid and of 6α,9α-difluoro-11β,20β$_F$-dihydroxy-3-oxo-16α-methyl-1,4-pregnadien-21-oic acid, as well as 3.1 g. of the ethyl ester of 6α,9α-difluoro-11β,20β$_F$-dihydroxy-3-oxo-16α-methyl-14-pregnadiene-21-oic acid, m.p. 215–216° C. [α]$_D^{25}$=+16° (dioxane).

Example 10

Under the reaction conditions described in Example 2, a mixture of the butyl esters of 6α,9α-difluoro-11β,20α$_F$-dihydroxy-3-oxo-16α-methyl-1,4-pregnadien-21-oic acid and of 6α,9α-difluoro-11β,20β$_F$-dihydroxy-3-oxo-16α-methyl-1,4-pregnadien-21-oic acid is obtained from 6α,9α-difluoro-11β,21-dihydroxy-16α-methyl-1,4-pregnadiene-3,20-dione.

Example 11

Under the reaction conditions described in Example 1, using 16.0 g. of 6α-fluoro-9α-chloro-11β,21-dihydroxy-16α-methyl-1,4-pregnadiene-3,20-dione, the product is a mixture of 8.3 g. of the methyl esters of 6α-fluoro-9α-chloro-11β,20α$_F$-dihydroxy-3-oxo-16α-methyl-1,4-pregnadien-21-oic acid and of 6α-fluoro-9α-chloro-11β,20β$_F$-dihydroxy-3-oxo-16α-methyl-1,4-pregnadiene-21-oic acid, as well as 2.3 g. of the methyl ester of 6α-fluoro-9α-chloro-11β,20β$_F$-dihydroxy-3-oxo-16α-methyl-1,4-pregnadiene-21-oic acid, decomposition point 245° C. [α]$_D^{25}$=+46° (dioxane).

Example 12

Under the reaction conditions set forth in Example 2, one obtains from 8.0 g. of 6α-fluoro-9α-chloro-11β,21-dihydroxy-16α-methyl-1,4-pregnadiene-3,20-dione 1.35 g. of the butyl ester of 6α-fluoro-9α-chloro-11β,20α$_F$-dihydroxy-3-oxo-16α-methyl-1,4-pregnadien-21-oic acid, m.p. 175° C. (from hexane-acetone), [α]$_D^{25}$=+33° (chloroform); and 640 mg. of the butyl ester of 6α-fluoro-9α-chloro-11β,20β$_F$-dihydroxy-3-oxo-16α-methyl-1,4-pregnadien-21-oic acid, m.p. 196° C. (acetone-hexane), [α]$_D^{25}$=+41° (chloroform).

Example 13

Under the reaction conditions described in Example 1, but utilizing cyclohexanol as the solvent, the yield, from 11β,21-dihydroxy-6α,16α-dimethyl-1,4-pregnadiene-3,20-dione is a mixture of the cyclohexyl esters of 11β,20α$_F$-dihydroxy-3-oxo-6α,16α-dimethyl-1,4-pregnadien-21-oic acid and of 11β,20β$_F$-dihydroxy-3-oxo-6α,16α-dimethyl-1,4-pregnadien-21-oic acid.

Example 14

Using the reaction conditions set forth in Example 1, one produces from 19.8 g. of 6α-fluoro-9α,11β-dichloro-21-hydroxy 16α-methyl-1,4-pregnadiene-3,20-dione 12.3 g. of the methyl ester of 6α-fluoro-9α,11β-dichloro-20β$_F$-hydroxy-3-oxo-16α-methyl-1,4-pregnadien-21-oic acid, m.p. 217–219° C. (from acetone-hexane). [α]$_D^{25}$=+82° (dioxane).

Example 15

Under the reaction conditions described in Example 1, using 18.1 g. of 6α,11β-difluoro-9α-chloro-21-hydroxy-16α-methyl-1,4-pregnadiene-3,20-dione, one obtains 12.1 g. of the methyl ester of 6α,11β-difluoro-9α-chloro-20β$_F$-hydroxy-3-oxo-16α-methyl-1,4-pregnadien-21-oic acid, m.p. 246–247° C. (from acetone-hexane). [α]$_D^{25}$+=34° (dioxane).

Example 16

4.12 g. of 6α-fluoro-11β,21-dihydroxy-16α-methyl-1,4-pregnadiene-3,20-dione is dissolved in 100 ml. of methanol and mixed with 1.49 g. of copper(II) acetate. For 15 minutes, air is passed through the reaction mixture, and the latter is allowed to stand for 45 minutes. The solvent is distilled off and the crude product taken up in ethyl acetate. The solution is washed with sodium bicarbonate solution, dried with sodium sulfate, and concentrated by evaporation. The residue, which is 6α-fluoro-11β,21-dihydroxy-21-methoxy-16α-methyl-1,4-pregnadiene-3,20-dione, is dissolved in 18 ml. of methanol and added to a mixture of 1.1 liter of water and 20 ml. of 1N sodium hydroxide solution. The suspension is stirred for 48 hours at room temperature under an argon atmosphere. The reaction mixture is acidified with 1N hydrochloric acid and exhaustively extracted with methylene chloride. The extract is dried and evaporated, and the residue is recrystallized from acetone. Yield: 1.03 g. of 6α-fluoro-11β,20α$_F$-dihydroxy-3-oxo-16α-methyl-1,4-pregnadien-21-oic acid, m.p. 250–251° C. (under decomposition). [α]$_D^{25}$=+16° (dioxane).

Example 17

16.0 g. of 6α-fluoro-11β,21-dihydroxy-16α-methyl-1,4-pregnadiene-3,20-dione is reacted with hexanol under the conditions described in Example 1, thus obtaining 2.32 g. of the hexyl ester of 6α-fluoro-11β,20α$_F$-dihydroxy-3-oxo-16α-methyl-1,4-pregnadien-21-oic acid, m.p. 99° C., [α]$_D^{25}$=+32° (chloroform); and 4.89 g. of the hexyl ester of 6α-fluoro-11β,20β$_F$-dihydroxy-3-oxo-16α-methyl-1,4-pregnadien-21-oic acid, m.p. 162–169° C., [α]$_D^{25}$=+11° (chloroform).

Example 18

10.5 g. of 6α-fluoro-11β,21-dihydroxy-16α-methyl-1,4-pregnadiene-3,20-dione is reacted with cyclohexanol under the conditions set forth in Example 1, thus producing 2.29 g. of the cyclohexyl ester of 6α-fluoro-11β,20α$_F$-dihydroxy-3-oxo-16α-methyl-1,4-pregnadien-21-oic acid, m.p. 107° C., [α]$_D^{25}$=+12° (dioxane); and 3.85 g. of the cyclohexyl ester of 6α-fluoro-11β,20β$_F$-dihydroxy-3-oxo-16α-methyl-1,4-pregnadien-21-oic acid, m.p. 228° C., [α]$_D^{25}$=+14° (dioxane).

Example 19

12.0 g. of 6α-fluoro-11β,21-dihydroxy-16α-methyl-1,4-pregnadiene-3,20-dione is reacted with decanol under the conditions set out in Example 1, thus obtaining 1.8 g. of the decyl ester of 6α-fluoro-11β,20α$_F$-dihydroxy-3-oxo-16α-methyl-1,4-pregnadien-21-oic acid as a viscous oil, $[\alpha]_D^{25}=+8°$ (chloroform) and 2.67 g. of the decyl ester of 6α-fluoro - 11β,20β$_F$-dihydroxy-3-oxo-16α-methyl-1,4-pregnadien-21-oic acid, m.p. 123–125° C., $[\alpha]_D^{25}=+13°$ (chloroform).

Example 20

(a) 107.0 g. of 9α-fluoro-11β,17α,21-trihydroxy-16α-methyl-1,4-pregnadiene-3,20-dione is dissolved in 2 liters of glacial acetic acid and mixed with 10.0 g. of zinc acetate containing water of crystallization. The reaction mixture is refluxed for 4 hours and then precipitated into 10 liters of ice water. The precipitate is filtered off and taken up in methylene chloride, which is thereupon washed neutral with water. The solvent is removed by drying over anhydrous sodium sulfate and evaporation under vacuum, thus producing 112.0 g. of a mixture of 9α-fluoro - 11β,20 - dihydroxy-3-oxo-16α-methyl-1,4,17-(20)-pregnatrien-21-al and 9α-fluoro - 11β - hydroxy-20-acetoxy-3-oxo-16α-methyl - 1,4,17(20)-pregnatrien-21-al as a viscous oil.

(b) 108.0 g. of the above mixture is dissolved in 3 liters of methanol and mixed with a solution of 15.0 g. of potassium hydroxide in 30 ml. of water. The reaction mixture is refluxed for 1½ hours under an argon atmosphere, and then the methanol is distilled off under vacuum. The remainder is taken up in 2 liters of water and 2 liters of methylene chloride and, for purposes of further purification, the aqueous phase is repeatedly extracted with methylene chloride. The aqueous solution is acidified with 4N sulfuric acid and again extracted several times with methylene chloride, which is thereupon dried over sodium sulfate. After evaporation of the solvent under vacuum, one obtains 52.0 g. of a mixture of 9α - fluoro-11β,20α$_F$-dihydroxy-3-oxo-16α-methyl-1,4-pregnadien-21-oic acid and 9α-fluoro - 11β,20β$_F$ - dihydroxy-3-oxo-16α-methyl-1,4-pregnadien-21-oic acid as a solid crystal cake.

(c) 36.0 g. of the just-described acid mixture is mixed with 200 ml. of methanol and cooled to 0° C. In incremental portions, an ether solution of diazomethane in one liter of ether is added thereto, which ether solution has been produced from 30 g. of nitrosomethyl urea by decomposition with 40% potassium hydroxide solution. The mixture is stored at room temperature for one hour. The solvents are then removed under vacuum, after gently eliminating the excess of diazomethane with 5 ml. of glacial acetic acid. The residue is taken up in methylene chloride, and the solution is repeatedly washed with water. The reaction mixture is dried over anhydrous sodium sulfate, and the crude product is chromatographed on 750 g. of silica gel.

With 6–9% methylene chloride-acetone, 2.1 g. of the methyl ester of 9α-fluoro-11β,20α$_F$-dihydroxy-3-oxo-16α-methyl-1,4-pregnadien-21-oic acid is eluted.

Recrystallized from acetone-hexane, the product amounts to 1.22 g., m.p. 199.3° C. $[\alpha]_D^{25}=+2.8°$ (chloroform).

With 10–12% methylene chloride-acetone, 23.8 g. of a mixture of the 20α- and 20β-compounds is obtained by elution.

With 13–14% methylene chloride-acetone, the eluted product is 1.19 g. of the methyl ester of 9α-fluoro-11β,20β$_F$-dihydroxy-3-oxo - 16α - methyl - 1,4 - pregnadien-21-oic acid. The crude product is recrystallized from acetone-hexane, thus producing 794 mg., m.p. 206.5° C. $[\alpha]_D^{25}=+23°$ (chloroform).

Example 21

1.0 g. of the decyl ester of 6α-fluoro-11β,20β$_F$-dihydroxy-3-oxo-16α-methyl-1,4-pregnadien-21-oic acid is dissolved in 15 ml. of pyridine, and the solution is mixed with 3 ml. of acetic anhydride. The mixture is allowed to react overnight at room temperature and then precipitated with 500 ml. of water containing 50 g. of sodium chloride. The precipitate is filtered off and taken up in methylene chloride. The solution is washed several times with water and dried over anhydrous sodium sulfate. After evaporation of the solvent, there remains 1.12 g. of crude product which is chromatographed on 250 g. of silica gel. With 6–9% acetone-hexane, 680 mg. of the decyl ester of 6α-fluoro-11β-hydroxy-20β$_F$-acetoxy-3-oxo-16α-methyl - 1,4 - pregnadien-21-oic acid is eluted which, after evaporation of the solvents, forms an amorphous powder. Melting point: 129–131° C. $[\alpha]_D^{25}=+24°$ (chloroform).

Example 22

500 mg. of the cyclohexyl ester of 6α-fluoro-11β,20β$_F$-dihydroxy-3-oxo - 16α - methyl - 1,4 -pregnadien-21-oic acid is reacted with the reactants indicated in Example 21 and worked up under the same conditions. After the crude product has been chromatographed and recrystallized, one obtains 202 mg. of the cyclohexyl ester of 6α - fluoro - 11β - hydroxy - 20β$_F$ - acetoxy-3-oxo-16α-methyl - 1,4 - pregnadien-21-oic acid, m.p. 238.8° C. $[\alpha]_D^{25}=+22°$ (chloroform).

Example 23

900 mg. of the isopentyl ester of 6α-fluoro-11β,20α$_F$-dihydroxy-3-oxo-16α-methyl-1,4-pregnadien-21-oic acid is dissolved in 12 ml. of pyridine and mixed with 3 ml. of propionic acid anhydride. The mixture is allowed to react for 3 days and then precipitated with 300 ml. of ice water containing sodium chloride. The precipitated product is filtered off, taken up in methylene chloride, and washed, whereafter it is dried over anhydrous sodium sulfate and the solvent evaporated under vacuum. The crude product is recrystallized from acetone-hexane, thus obtaining 578 mg. of the isopentyl ester of 6α-fluoro-11β-hydroxy - 20α$_F$ - propionyloxy-3-oxo-16α-methyl-1,4-pregnadien-21-oic acid, m.p. 148.2° C. $[\alpha]_D^{25}=+52°$ (chloroform).

Example 24

As described in Example 23, 600 mg. of the isopentyl ester of 6α-fluoro-11β,20β$_F$-dihydroxy-3-oxo-16α-methyl-1,4-pregnadien-21-oic acid, dissolved in pyridine, is reacted with 3 ml. of butyric acid anhydride. The reaction mixture is worked up as described above and, after recrystallization of the crude product from acetone-hexane, one obtains 526 mg. of the isopentyl ester of 6α-fluoro-11β-hydroxy - 20β$_F$ - butyryloxy-3-oxo-16α-methyl-1,4-pregnadien-21-oic acid, m.p. 194.6° C. $[\alpha]_D^{25}=+26°$ (chloroform).

Example 25

As described in Example 21, 1.10 g. of the hexyl ester of 6α - fluoro-11β,20α$_F$-dihydroxy-3-oxo-16α-methyl-1,4-pregnadien-21-oic acid in 10 ml. of pyridine is reacted with 2 ml. of acetic anhydride and then worked up as described above. After purification by chromatography and recrystallization from acetone-hexane, 846 mg. of the hexyl ester of 6α-fluoro-11β-hydroxy-20α$_F$-acetoxy-3-oxo-16α-methyl-1,4-pregnadien-21-oic acid is obtained, m.p. 159.9° C. $[\alpha]_D^{25}=+50°$ (chloroform).

Example 26

600 mg. of the methyl ester of 6α,9α-difluoro-11β,20α$_F$-dihydroxy-3-oxo-16α-methyl - 1,4 - pregnadien-21-oic acid is dissolved in 20 ml. of pyridine and mixed with 2 ml. of butyric acid anhydride. The reaction mixture is worked up as set forth in Example 22, and the crude product is purified by crystallization from acetone-hexane, thus obtaining 381 mg. of the methyl ester of 6α,9α - difluoro - 11β - hydroxy-20α$_F$-butyryloxy-3-oxo-16α-methyl-1,4-pregnadien-21-oic acid, m.p. 188.4° C. $[α]_D^{25}=+49°$ (chloroform).

Example 27

650 mg. of the methyl ester of 6α,9α-difluoro-11β,20β$_F$-dihydroxy - 3 - oxo-16α-methyl-1,4-pregnadien-21-oic acid is dissolved in 15 ml. of pyridine and mixed with 3 ml. of caproic acid anhydride. After 6 days of reaction at room temperature, the reaction mixture is worked up as set forth in Example 23. After recrystallization of the crude product from acetone-hexane, one produces 710 mg. of the methyl ester of 6α,9α-difluoro-11β-hydroxy-20β$_F$-hexanoyloxy - 3 - oxo - 16α - methyl-1,4-pregnadien-21-oic acid, m.p. 83.6° C. $[α]_D^{25}=+17.2°$ (chloroform).

Example 28

700 mg. of the ethyl ester of 6α,9α-difluoro-11β,20β$_F$-dihydroxy - 3 - oxo-16α-methyl-1,4-pregnadien-21-oic acid in 15 ml. of pyridine and 3 ml. of caprylic acid anhydride are allowed to stand at room temperature for 6 days and then worked up as described in Example 23. After recrystallization from acetone-hexane, one obtains 561 mg. of the ethyl ester of 6α,9α-difluoro-11β-hydroxy-20β$_F$-octanoyloxy-3-oxo-16α-methyl - 1,4 - pregnadien - 21 - oic acid, m.p. 163.0° C. $[α]_D^{25}=+29°$ (chloroform).

Example 29

700 mg. of the methyl ester of 6α-fluoro-9α,11β-dichloro-20β$_F$-hydroxy - 3 - oxo-16α-methyl-1,4-pregnadien-21-oic acid, dissolved in 15 ml. of pyridine, and 2 ml. of valeric acid anhydride are reacted and worked up as described in Example 23. After recrystallizing the crude product from acetone-hexane, 780 mg. of the methyl ester of 6α-fluoro-9α,11β-dichloro - 20β$_F$ - valeryloxy - 3 - oxo-16α-methyl-1,4-pregnadien-21-oic acid is obtained, m.p. 217.1° C. (under decomposition). $[α]_D^{25}=+73°$ (chloroform).

Example 30

700 mg. of the hexyl ester of 6α-fluoro-11β,20β$_F$-dihydroxy-3-oxo-16α-methyl-1,4-pregnadien-21-oic acid is dissolved in 15 ml. of pyridine and reacted with 2 ml. of propionic acid anhydride. The reaction mixture is worked up and purified by chromatography as described in Example 21, thus obtaining 570 mg. of the hexyl ester of 6α-fluoro-11β-hydroxy - 20β$_F$ - propionyloxy - 3 - oxo-16α-methyl-1,4-pregnadien-21-oic acid, m.p. 124.5° C. $[α]_D^{25}=+23°$ (chloroform).

Example 31

250 mg. of the methyl ester of 6α-fluoro-11β,20α$_F$-dihydroxy-3-oxo-16α-methyl-1,4-pregnadien-21-oic acid is dissolved in 3 ml. of pyridine and mixed with 1 ml. of acetic anhydride. The reaction mixture is worked up further as described in Example 21. After recrystallization of the crude product, purified by chromatography, from acetone-hexane, one obtains 143 mg. of the methyl ester of 6α-fluoro-11β-hydroxy - 20α$_F$ - acetoxy - 3 - oxo-16α-methyl-1,4-pregnadien - 21 - oic acid, m.p. 167.6° C. $[α]_D^{25}=+53°$ (chloroform).

Example 32

250 mg. of the methyl ester of 6α-fluoro-11β,20β$_F$-dihydroxy-3-oxo-16α-methyl-1,4-pregnadien-21-oic acid is dissolved in 3 ml. of pyridine and mixed with 1 ml. of acetic anhydride. The reaction mixture is worked up as set forth in Example 23. By recrystallizing the crude product from acetone-hexane, 145 mg. of the methyl ester of 6α-fluoro-11β-hydroxy-20β$_F$-acetoxy - 3 - oxo-16α-methyl-1,4-pregnadien-21-oic acid is obtained, m.p. 185.3° C. $[α]_D^{25}=+31°$ (chloroform).

Example 33

As described in Example 23, 1.03 g. of the butyl ester of 6α-fluoro-11β,20β$_F$-dihydroxy - 3 - oxo-16α-methyl-1,4-pregnadien-21-oic acid, dissolved in 8 ml. of pyridine, is allowed to react with 2 ml. of butyric acid anhydride. After the reaction mixture has been worked up and crystallized from acetone-hexane, the yield is 784 mg. of the butyl ester of 6α-fluoro-11β-hydroxy-20β$_F$-butyryloxy-3-oxo-16α-methyl-1,4-pregnadien-21-oic acid, m.p. 183° C. $[α]_D^{25}=+28.5°$ (chloroform).

Example 34

700 mg. of the tert.-butyl ester of 6α-fluoro-11β,20β$_F$-dihydroxy - 3 - oxo-16α-methyl-1,4-pregnadien-21-oic acid is mixed with 10 ml. of pyridine and 3 ml. of butyric acid anhydride. After 5 days, the reaction mixture is worked up as indicated in Example 21. After recrystallization of the crude product from acetone-hexane, one obtains 104 mg. of the tert.-butyl ester of 6α-fluoro-11β-hydroxy-20β$_F$-butyryloxy - 3 - oxo-16 α- methyl-1,4-pregnadien-21-oic acid, m.p. 202.2° C. $[α]_D^{25}=+23°$ (chloroform).

Example 35

1.32 g. of the methyl ester of 6α-fluoro-11β,20α$_F$-dihydroxy - 3 - oxo-16α-methyl-1,4-pregnadien-21-oic acid, dissolved in 50 ml. of methanol, is mixed at room temperature with 5 ml. of 1N sodium hydroxide solution. After 20 hours, the mixture is diluted with 200 ml. of water and repeatedly extracted with methylene chloride. The aqueous phase is thereupon acidified with 10 ml. of 1N sulfuric acid and repeatedly extracted with methylene chloride. The latter is dried over sodium sulfate and evaporated under vacuum. The residue is triturated with a small amount of ethyl acetate. After allowing the mixture to stand for a period of time, the thus-produced crystallized product is vacuum-filtered, thus obtaining 225 mg. of 6α-fluoro-11β,20α$_F$-dihydroxy - 3 - oxo-16α-methyl-1,4-pregnadien-21-oic acid, m.p. 252.3° C. (under decomposition). $[α]_D^{25}=+15.8°$ (chloroform).

Example 36

4.1 g. of the methyl ester of 6α-fluoro-11β,20β$_F$-dihydroxy-3-oxo-16α-methyl-1,4-pregnadien-21-oic acid is dissolved in 100 ml. of methanol and mixed with 5 ml. of 1N sodium hydroxide solution at room temperature. The reaction mixture is worked up as described in Example 35, thus obtaining 3.10 g. of 6α-fluoro-11β,20β$_F$-dihydroxy-3-oxo-16α-methyl-1,4-pregnadien-21-oic acid as a viscous oil. $[α]_D^{25}=+23°$ (dioxane).

Example 37

2.15 g. of 6α - fluoro - 11β,20β$_F$-dihydroxy-3-oxo-16α-methyl - 1,4 - pregnadien-21-oic acid is dissolved in 100 ml. of acetone and mixed, at room temperature, with 1 ml. of 70% strength perchloric acid. After a reaction time of 5 days, the product is precipitated with 2 liters of water containing sodium chloride which is filtered off from the precipitate. The latter is taken up in methylene chloride, and the solution is washed with saturated sodium bicarbonate solution and with water. The mixture is dried over sodium sulfate, and the solvent is evaporated under vacuum. For purposes of purification, the crude product is chromatographed on 250 g. of silica gel. With 7–10% acetone - hexane, 960 mg. of 6α-fluoro-11β-hydroxy-20β$_F$, 21 - isopropylidenedioxy - 16α-methyl-1,4-pregnadiene-3, 21-dione is obtained by elution. By recrystallization from acetone-hexane, 412 mg. of crystals are obtained which melt at 276.5° C. under decomposition. $[α]_D^{25}=+7.8°$ (chloroform).

Example 38

490 mg. of 6α - fluoro - 11β,20α$_F$-dihydroxy-3-oxo-16α-methyl-1,4-pregnadien-21-oic acid is dissolved in 10 ml. of acetone and mixed with 2 drops of 70% perchloric acid at room temperature. After 22 hours, the reaction mixture is worked up and purified as set forth in Example 37. After recrystallization of the chromatographed product, one obtains 152 mg. of 6α-fluoro-11β-hydroxy-20α$_F$, 21 - isopropylidenedioxy-16α-methyl-1,4-pregnadiene-3,21-dione, m.p. 192.1° C. (under decomposition). [α]$_D^{25}$= +14° (chloroform).

Example 39

15.1 g. of a mixture of 9α-fluoro-11β,20α$_F$-dihydroxy-3-oxo-16α-methyl-1,4-pregnadien-21-oic acid and 9α-fluoro-11β,20β$_F$ - dihydroxy - 3-oxo-16α-methyl-1,4-pregnadien-21-oic acid is dissolved in 750 ml. of acetone and mixed, at room temperature, with 1 ml. of 70% perchloric acid. After 5 days, the recation mixture is worked up as disclosed in Example 37. The crude product (12.1 g) is chromatographed on 750 g. of silica gel. With 6–8% acetone-methylene chloride, 1.74 g. of 9α-fluoro-11β-hydroxy - 20β$_F$,21 - isopropylidenedioxy - 16α - methyl-1,4-pregnadiene-3,21-dione is eluted, melting at 276.3° C. upon crystallization from acetone-hexane. [α]$_D^{25}$=+6.4° (chloroform).

With 8–10% acetone-methylene chloride, one obtains 9.3 g. of a mixture of the 20α$_F$- and 20α$_F$-compounds.

With 11–13% acetone-methylene chloride, 1.3 g. of 9α-fluoro - 11β - hydroxy-20α$_F$,21-isopropylidenedioxy-16α-methyl-1,4-pregnadiene-3,21-dione is eluted which, when crystallized from acetonehexane, melts at 257.0° C. under decomposition. [α]$_D^{25}$=+29° (chloroform).

Example 40

900 mg. of the methyl ester of 9α-fluoro-11β,20α$_F$-dihydroxy-3-oxo-16α-methyl-1,4-pregnadien-21-oic acid is dissolved in 10 ml. of pyridine and mixed with 2 ml. of butyric acid anhydride. After allowing the reaction mixture to stand for two days at room temperature, it is worked up as indicated in Example 23 and purified by a single crystallization of the crude product, thus producing 588 mg. of the methyl ester of 9α-fluoro-11β-hydroxy-20α$_F$ - butyryloxy - 3-oxo-16α-methyl-1,4-pregnadien-21-oic acid, m.p. 187.4° C. [α]$_D^{25}$=+54° (chloroform).

Example 41

400 mg. of the methyl ester of 9α-fluoro-11β,20β$_F$-dihydroxy-3-oxo-16α-methyl-1,4-pregnadien-21-oic acid is dissolved in 10 ml. of pyridine and mixed with 2 ml. of butyric acid anhydride. The reaction mixture is allowed to stand for two days at room temperature and then worked up as set forth in Example 23. By a single crystallization of the crude product, one obtains 378 mg. of the methyl ester of 9α - fluoro-11β-hydroxy-20β$_F$-butyryloxy-3-oxo-16α-methyl-1,4-pregnadien-21-oic acid, m.p. 182.9° C. [α]$_D^{25}$=+36° (chloroform).

Example 42

Under the conditions set forth in Example 2, 20.0 g. of 6α - fluoro - 11β,21 - dihydroxy-16α-methyl-4-pregnene-3,20-dione is recated, thus obtaining 15.3 g. of a mixture of the butyl esters of 6α-fluoro-11β,20α$_F$-dihydroxy-3-oxo-16α-methyl-4-pregnen-21-oic acid and of 6α-fluoro-11β,20β$_F$ - dihydroxy-3-oxo-16α-methyl-4-pregnen-21-oic acid, and 300 mg. of the butyl ester of 6α-fluoro-11β,20α$_F$-dihydroxy-3-oxo-16α-methyl-4-pregnen-21-oic acid, m.p. 94° C. (from methylene chloride-diisopropyl ether),

[α]$_D^{25}$=+54°

(chloroform), as well as 2.8 g. of the butyl ester of 6α-fluoro - 11β,20β$_F$-dihydroxy-3-oxo-16α-methyl-4-pregnen-21-oic acid, m.p. 139° C. (from acetone-hexane),

[α]$_D^{25}$=+65°

(chloroform).

Example 43

Under the conditions described in Example 1, one obtains from 7.0 g. of 11β,21-dihydroxy-16α-methyl-1,4-pregnadiene-3,20-dione, 5.8 g. of a mixture of the butyl esters of 11β,20α$_F$-dihydroxy-3-oxo-16α-methyl-1,4-pregnadien-21-oic acid and of 11β,20β$_F$-dihydroxy-3-oxo-16α-methyl-1,4-pregnadien-21-oic acid, as well as the pure compounds: 230 mg. of the butyl ester of 11β,20α$_F$-dihydroxy-3-oxo-16α-methyl-1,4-pregnadien-21-oic acid, m.p. 166.3° C. (from methylene chloride-diisopropyl ether), [α]$_D^{25}$=+2.7° (chloroform); and 880 mg. of the butyl ester of 11β,20β$_F$ - dihydroxy-3-oxo-16α-methyl-1,4-pregnadien - 21 - oic acid, m.p. 177.7° C. (from acetone-hexane), [α]$_D^{25}$=+12.7° (chloroform).

Example 44

Under the reaction conditions described in Example 1, 10.0 g. of 6α,9α-difluoro-11β,21-dihydroxy-16α-methyl-1,4-pregnadiene-3,20-dione is recated with 5 g. of copper(II) acetate and 250 ml. of n-butanol. After chromatographing the crude product, the following compounds are isolated: 1.05 g. of the butyl ester of 6α,9α-difluoro-11β,20α$_F$ - dihydroxy - 3-oxo-16α-methyl-1,4-pregnadien-21-oic acid, m.p. 143° C. (ether), [α]$_D^{25}$=+6.1° (chloroform), and 1.37 g. of the butyl ester of 6α,9α-difluoro - 11β,20β$_F$ - dihydroxy - 3 - oxo-16α-methyl-1,4-pregnadien-21-oic acid, m.p. 187.3° C. (acetone-hexane), [α]$_D^{25}$=+12.8° (chloroform).

Example 45

Under the reaction conditions set forth in Example 1, 10.0 g. of 6α - fluoro - 11β,21-dihydroxy-16α-methyl-1,4-pregnadien-3,20-dione is reacted with 6 g. of copper(II) acetate and 300 ml. of ethylene glycol. After chromatography of the crude product, 1.81 g. of the 2'-hydroxyethyl ester of 6α-fluoro-11β,20β$_F$-dihydroxy-3-oxo-16α-methyl-1,4-pregnadien-21-oic acid is produced, m.p. 205° C. (acetone-hexane), [α]$_D^{25}$=+54° (pyridine).

Example 46

2.0 g. of the butyl ester of 6α-fluoro-11β,20β$_F$-dihydroxy - 3 - oxo-16α-methyl-1,4-pregnadien-21-oic acid is dissolved in 35 ml. of benzyl alcohol and mixed with 50 mg. of potassium tert.-butylate. The mixture is heated on a steam bath under an argon atmosphere for 28 hours. The reaction mixture is diluted with methylene chloride, washed with dilute acetic acid and water, and dried. The solvent is distilled off under vacuum and the residue chromatographed on silica gel, thus obtaining 431 mg. of the benzyl ester of 6α-fluoro-11β,20β$_F$-dihydroxy-3-oxo-16α-methyl-1,4-pregnadien-21-oic acid, m.p. 216° C. (acetone-hexane), [α]$_D^{25}$=+57° (pyridine).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pregnanoic acid derivative of the formula

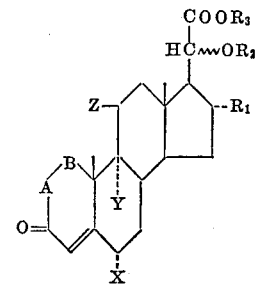

wherein —OR$_2$ is in the α$_F$ or β$_F$-position; —A—B— is —CH$_2$—CH$_2$—, —CH=CH— or —CCl=CH—; R$_1$ is hydrogen or methyl; R$_2$ is hydrogen or the acyl radical of a physiologically acceptable acid of up to 15 carbon atoms and R$_3$ is hydrogen or hydrocarbon of up to 18 carbon atoms or $R_2$ and $R_3$ collectively are dialkylmethylene wherein each alkyl is of 1–4 carbon atoms or cycloalkylidene of 5 to 7 ring carbon atoms; X is hydrogen, halogen or methyl; Y is hydrogen or halogen; Z is hydroxy or a halogen atom having the same atomic weight no greater than Y; and wherein at least one of X, Y and $R_1$ is other than hydrogen.

2. A compound of Claim 1 wherein $R_2$ is H, alkanoyl of 1–8 carbon atoms and $R_3$ is H or alkyl of 1–4 carbon atoms or cycloalkyl of 5 or 6 ring carbon atoms or, collectively $R_2$ and $R_3$ are dialkylmethylene wherein each alkyl is of 1–4 carbon atoms or cyclopentylidene or cyclohexylidene.

3. A compound of Claim 2 wherein $R_1$ is methyl.

4. A compound of Claim 3 wherein —A—B— is —CH=CH—.

5. A compound of Claim 4 wherein X is H or F and Y and Z are H, Cl, or F.

6. A compound of Claim 1, methyl ester of 6α-fluoro-11β,20α$_F$-dihydroxy-3-oxo - 16α - methyl-1,4-pregnadien-21-oic acid.

7. A compound of Claim 1, methyl ester of 6α-fluoro-11β,20β$_F$-dihydroxy-3-oxo - 16α - methyl-1,4-pregnadien-21-oic acid.

8. A compound of Claim 1, butyl ester of 6α-fluoro-11β,20α$_F$-dihydroxy-3-oxo - 16α - methyl-1,4-pregnadien-21-oic acid.

9. A compound of Claim 1, butyl ester of 6α-fluoro-11β,20β$_F$-dihydroxy-3-oxo - 16α - methyl-1,4-pregnadien-21-oic acid.

10. A compound of Claim 1, isobutyl ester of 6α-fluoro-9α-chloro-11β,20α$_F$-dihydroxy-3-oxo-16α-methyl - 1,4-pregnadien-21-oic acid.

11. A compound of Claim 1, isobutyl ester of 6α-fluoro-9α-chloro-11β,20β$_F$-dihydroxy-3-oxo-16α-methyl - 1,4-pregnadien-21-oic acid.

12. A compound of Claim 1, methyl ester of 6α,9α-difluoro-11β,20α$_F$-dihydroxy - 3 - oxo-16α-methyl-1,4-pregnadien-21-oic acid.

13. A compound of Claim 1, methyl ester of 6α,9α-difluoro-11β,20β$_F$-dihydroxy - 3 - oxo-16α-methyl-1,4-pregnadien-21-oic acid.

14. A compound of Claim 1, methyl ester of 6α-fluoro-2-chloro-11β,20α$_F$-dihydroxy - 3 - oxo-16α-methyl-1,4-pregnadien-21-oic acid.

15. A compound of Claim 1, methyl ester of 6α-fluoro-2-chloro-11β,20β$_F$-dihydroxy - 3 - oxo-16α-methyl-1,4-pregnadien-21-oic acid.

16. A compound of Claim 1, isopropyl ester of 6α-fluoro-11β,20α$_F$-dihydroxy-3-oxo - 16α - methyl-1,4-pregnadien-21-oic acid.

17. A compound of Claim 1, isopropyl ester of 6α-fluoro-11β,20β$_F$-dihydroxy-3-oxo-16α-methyl-1,4 - pregnadien-21-oic acid.

18. A compound of Claim 1, isopentyl ester of 6α-fluoro-11β,20α$_F$-dihydroxy - 3 - oxo-16α-methyl-1,4-pregnadien-21-oic acid.

19. A compound of Claim 1, isopentyl ester of 6α-fluoro-11β,20β$_F$-dihydroxy-3-oxo-16α-methyl-1,4 - pregnadien-21-oic acid.

20. A compound of Claim 1, tert.-butyl ester of 6α-fluoro-11β,20α$_F$-dihydroxy-3-oxo-16α-methyl-1,4 - pregnadien-21-oic acid.

21. A compound of Claim 1, tert.-butyl ester of 6α-fluoro-11β,20β$_F$-dihydroxy - 3 - oxo-16α-methyl-1,4-pregnadien-21-oic acid.

22. A compound of Claim 1, ethyl ester of 6α,9α-difluoro-11β,20α$_F$-dihydroxy - 3 - oxo-16α-methyl-1,4-pregnadien-21-oic acid.

23. A compound of Claim 1, ethyl ester of 6α,9α-difluoro-11β,20β$_F$-dihydroxy - 3 - oxo-16α-methyl-1,4-pregnadien-21-oic acid.

24. A compound of Claim 1, butyl ester of 6α,9α-difluoro-11β,20α$_F$-dihydroxy - 3 - oxo-16α-methyl-1,4-pregnadien-21-oic acid.

25. A compound of Claim 1, butyl ester of 6,α,9α-difluoro-11β,20β$_F$-dihydroxy - 3 - oxo-16α-methyl-1,4-pregnadien-21-oic acid.

26. A compound of Claim 1, methyl ester of 6α-fluoro-9α-chloro-11β,20α$_F$-dihydroxy-3-oxo-16α-methyl - 1,4-pregnadien-21-oic acid.

27. A compound of Claim 1, methyl ester of 6α-fluoro-9α-chloro-11β,20β$_F$-dihydroxy-3-oxo-16α-methyl - 1,4-pregnadiene-21-oic acid.

28. A compound of Claim 1, butyl ester of 6α-fluoro-9α-chloro-11β,20α$_F$-dihydroxy - 3 - oxo-16α-methyl-1,4-pregnadiene-21-oic acid.

29. A compound of Claim 1, butyl ester of 6α-fluoro-9α-chloro-11β,20β$_F$-dihydroxy - 3 - oxo-16α-methyl-1,4-pregnadiene-21-oic acid.

30. A compound of Claim 1, cyclohexyl ester of 11β,20α$_F$-dihydroxy-3-oxo-6α,16α-dimethyl - 1,4 - pregnadien-21-oic acid.

31. A compound of Claim 1, cyclohexyl ester of 11β,20β$_F$-dihydroxy-3-oxo-6α,16α-dimethyl - 1,4 - pregnadien-21-oic acid.

32. A compound of Claim 1, methyl ester of 6α-fluoro-9α,11β-dichloro-20β$_F$-hydroxy - 3 - oxo-16α-methyl-1,4-pregnadiene-21-oic acid.

33. A compound of Claim 1, methyl ester of 6α,11β-difluoro-9α-chloro-20β$_F$-hydroxy - 3 - oxo-16α-methyl-1,4-pregnadiene-21-oic acid.

34. A compound of Claim 1, 6α-fluoro-11β,20α$_F$-dihydroxy-3-oxo-16α-methyl-1,4-pregnadien-21-oic acid.

35. A compound of Claim 1, hexyl ester of 6α-fluoro-11β,20α$_F$-dihydroxy-3-oxo - 16α - methyl-1,4-pregnadien-21-oic acid.

36. A compound of Claim 1, hexyl ester of 6α-fluoro-11β,20β$_F$-dihydroxy-3-oxo - 16α - methyl-1,4-pregnadien-21-oic acid.

37. A compound of Claim 1, cyclohexyl ester of 6α-fluoro - 11β,20α$_F$-dihydroxy-3-oxo-16α-methyl-1,4-pregnadien-21-oic acid.

38. A compound of Claim 1, cyclohexyl ester of 6α-fluoro-11β,20β$_F$-dihydroxy - 3 - oxo-16α-methyl-1,4-pregnadien-21-oic acid.

39. A compound of Claim 1, decyl ester of 6α-fluoro-11β,20α$_F$-dihydroxy-3-oxo - 16α - methyl-1,4-pregnadien-21-oic acid.

40. A compound of Claim 1, decyl ester of 6α-fluoro-11β,20β$_F$-dihydroxy-3-oxo - 16α - methyl-1,4-pregnadien-21-oic acid.

41. A compound of Claim 1, 9α-fluoro-11β,20α$_F$-dihydroxy-3-oxo-16α-methyl-1,4-pregnadien-21-oic acid.

42. A compound of Claim 1, 9α-fluoro-11β,20β$_F$-dihydroxy-3-oxo-16α-methyl-1,4-pregnadien-21-oic acid.

43. A compound of Claim 1, methyl ester of 9α-fluoro-11β,20α$_F$-dihydroxy-3-oxo - 16α - methyl-1,4-pregnadien-21-oic acid.

44. A compound of Claim 1, methyl ester of 9α-fluoro-11β,20β$_F$ - dihydroxy-3-oxo - 16α - methyl-1,4-pregnadien-21-oic acid.

45. A compound of Claim 1, decyl ester of 6α-fluoro-11β-hydroxy-20β$_F$-acetoxy - 3 - oxo-16α-methyl-1,4-pregnadien-21-oic acid.

46. A compound of Claim 1, cyclohexyl ester of 6α-fluoro-11β-hydroxy-20β$_F$-acetoxy - 3 - oxo-16α-methyl-1,4-pregnadien-21-oic acid.

47. A compound of Claim 1, isopentyl ester of 6α-fluoro-11β-hydroxy-20α$_F$-propionyloxy-3-oxo-16α - methyl-1,4-pregnadien-21-oic acid.

48. A compound of Claim 1, isopentyl ester of 6α-fluoro-11β-hydroxy-20β$_F$-butyryloxy - 3 - oxo-16α-methyl-1,4-pregnadien-21-oic acid.

49. A compound of Claim 1, hexyl ester of 6α-fluoro-11β-hydroxy-20α$_F$-acetoxy - 3 - oxo-16α-methyl-1,4-pregnadien-21-oic acid.

50. A compound of Claim 1, methyl ester of 6α,9α-difluoro-11β-hydroxy-20α$_F$-butyryloxy - 3 - oxo-16α-methyl-1,4-pregnadien-21-oic acid.

51. A compound of Claim 1, methyl ester of 6α,9α-difluoro-11β-hydroxy-20β$_F$-hexanoyloxy-3-oxo-16α - methyl-1,4-pregnadien-21-oic acid.

52. A compound of Claim 1, ethyl ester of 6α,9α-difluoro-11β-hydroxy-20β$_F$-octanoyloxy-3-oxo-16α - methyl-1,4-pregnadien-21-oic acid.

53. A compound of Claim 1, methyl ester of 6α-fluoro-9α,11β-dichloro-20β$_F$-valeryloxy-3-oxo-16α-methyl - 1,4-pregnadien-21-oic acid.

54. A compound of Claim 1, hexyl ester of 6α-fluoro-11β-hydroxy-20β$_F$-propionyloxy - 3 - oxo-16α-methyl-1,4-pregnadien-21-oic acid.

55. A compound of Claim 1, methyl ester of 6α-fluoro-11β-hydroxy-20α$_F$-acetoxy - 3 - oxo-16α-methyl-1,4-pregnadien-21-oic acid.

56. A compound of Claim 1, methyl ester of 6α-fluoro-11β-hydroxy-20β$_F$-acetoxy - 3 - oxo-16α-methyl-1,4-pregnadien-21-oic acid.

57. A compound of Claim 1, butyl ester of 6α-fluoro-11β - hydroxy-20β$_F$-butyryloxy - 3 - oxo-16α-methyl-1,4-pregnadien-21-oic acid.

58. A compound of Claim 1, tert.-butyl ester of 6α-fluoro-11β-hydroxy-20β$_F$-butyryloxy-3-oxo-16α - methyl-1,4-pregnadien-21-oic acid.

59. A compound of Claim 1, 6α-fluoro-11β,20β$_F$-dihydroxy-3-oxo-16α-methyl-1,4-pregnadien-21-oic acid.

60. A compound of Claim 1, 6α-fluoro-11β-hydroxy-20β$_F$,21-isopropylidenedioxy-16α-methyl-1,4 - pregnadien-3,21-dione.

61. A compound of Claim 1, 6α-fluoro-11β-hydroxy-20α$_F$,21-isopropylidenedioxy-16α-methyl-1,4-pregnadiene-3,21-dione.

62. A compound of Claim 1, 9α-fluoro-11β-hydroxy-20β$_F$,21 - isopropylidenedioxy - 16α - methyl-1,4-pregnadiene-3,21-dione.

63. A compound of Claim 1, 9α-fluoro-11β-hydroxy-20α$_F$,21 - isopropylidenedioxy - 16α - methyl-1,4-pregnadiene-3,21-dione.

64. A compound of Claim 1, methyl ester of 9α-fluoro-11β - hydroxy-20α$_F$-butyryloxy - 3 - oxo-16α-methyl-1,4-pregnadien-21-oic acid.

65. A compound of Claim 1, methyl ester of 9α-fluoro-11β - hydroxy-20β$_F$-butyryloxy - 3 - oxo-16α-methyl-1,4-pregnadien-21-oic acid.

66. A compound of Claim 1, butyl ester of 6α-fluoro-11β,20α$_F$-dihydroxy-3-oxo - 16α - methyl-4-pregnen-21-oic acid.

67. A compound of Claim 1, butyl ester of 6α-fluoro-11β,20β$_F$-dihydroxy-3-oxo - 16α - methyl-4-pregnen-21-oic acid.

68. A compound of Claim 1, 6α-fluoro-11β,20α$_F$-dihydroxy-3-oxo-16α-methyl-1,4-pregnadien-21-oic acid.

69. A compound of Claim 1, butyl ester of 11β,20α$_F$-dihydroxy-3-oxo-16α-methyl-1,4-pregnadien-21-oic acid.

70. A compound of Claim 1, butyl ester of 11β,20β$_F$-dihydroxy-3-oxo-16α-methyl-1,4-pregnadien-21-oic acid.

71. A compound of Claim 1, 2'-hydroxyethyl ester of 6α - fluoro-11β,20β$_F$-dihydroxy - 3 - oxo-16α-methyl-1,4-pregnadien-21-oic acid.

72. A compound of Claim 1, benzyl ester of 6α-fluoro-11β,20β$_F$-dihydroxy-3-oxo - 16α - methyl-1,4-pregnadien-21-oic acid.

73. A process for making a compound of the formula

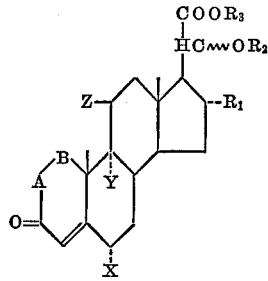

wherein the group —OR$_2$ is in the α$_F$- or β$_F$-position; X is hydrogen, halogen or methyl; Y is hydrogen or halogen; Z is hydrogen or halogen having an atomic weight no greater than Y; R$_1$ is hydrogen or methyl; R$_2$ is hydrogen or acyl as defined hereinafter and R$_3$ is hydrogen, an alkali-metal, or a saturated hydrocarbon of 1–18 carbon atoms which is unsubstituted or substituted, or a corresponding unsaturated hydrocarbon, or collectively R$_2$ and R$_3$ are dialkylmethylene or cycloalkylidene, at least one of R$_1$, R$_2$ and R$_3$ is other than a hydrogen atom; and —A—B— is —CH$_2$—CH$_2$—,  —CH=CH—,  —CCl=CH— which comprises (a) reacting a 21-hydroxy steroid of the general Formula II

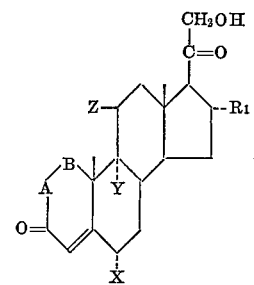

wherein —A—B—, X, Y, Z and R$_1$ have the values given above, with an alcohol in the presence of a copper (II) salt; or (b) rearranging a compound of the general Formula III

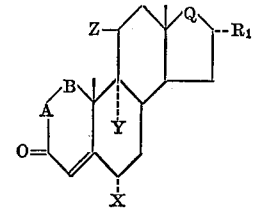

wherein —A—B—, X, Y, Z and R$_1$ have the values given above, and Q is one of the groupings:

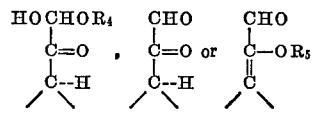

wherein R$_4$ is an alkyl group and R$_5$ is an acyl group, by treatment with strong bases; and optionally thereafter, saponifying any ester groups of the thus-produced product, and/or esterifying a free 20-hydroxy group and/or condensing a 21-oic acid with a ketone.

References Cited
UNITED STATES PATENTS
3,705,150   12/1972   Tuba et al. _____ 260—239.5

HENRY A. FRENCH, Primary Examiner

U.S. Cl. X.R.

260—397.1, 397.45; 424—241